(12) United States Patent
Chien

(10) Patent No.: US 9,860,496 B2
(45) Date of Patent: *Jan. 2, 2018

(54) PROJECTOR

(71) Applicants: QISDA OPTRONICS (SUZHOU) CO., LTD., Suzhou, Jiangsu Province (CN); QISDA CORPORATION, Taoyuan (TW)

(72) Inventor: Chih-Shiung Chien, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 36 days.

This patent is subject to a terminal disclaimer.

(21) Appl. No.: 15/005,010

(22) Filed: Jan. 25, 2016

(65) Prior Publication Data

US 2016/0241819 A1    Aug. 18, 2016

(30) Foreign Application Priority Data

Feb. 12, 2015   (TW) .............................. 104104819 A

(51) Int. Cl.
| | |
|---|---|
| G03B 21/28 | (2006.01) |
| H04N 9/31 | (2006.01) |
| G02B 27/12 | (2006.01) |
| G02B 26/08 | (2006.01) |
| G02B 5/04 | (2006.01) |
| G03B 21/20 | (2006.01) |

(52) U.S. Cl.
CPC .............. *H04N 9/315* (2013.01); *G02B 5/04* (2013.01); *G02B 26/0833* (2013.01); *G03B 21/2066* (2013.01)

(58) Field of Classification Search
CPC .. G03B 21/008; G03B 21/28; G03B 21/2066; G03B 21/208; G02B 27/126; G02B 13/16; H04N 9/3111; H04N 9/3114

USPC .......................................... 353/81, 33, 98, 99
See application file for complete search history.

(56) References Cited

U.S. PATENT DOCUMENTS

| | | | |
|---|---|---|---|
| 8,905,555 B2 * | 12/2014 | Jeon .................. | G02B 27/1033 353/30 |
| 2009/0190101 A1 * | 7/2009 | Alasaarela .............. | G02B 5/04 353/81 |
| 2013/0335709 A1 | 12/2013 | Akiyama | |
| 2015/0138446 A1 * | 5/2015 | Sheng ................. | G03B 21/008 348/766 |

(Continued)

FOREIGN PATENT DOCUMENTS

| | | |
|---|---|---|
| CN | 102565897 A | 7/2012 |
| TW | 200944926 | 11/2009 |
| TW | 201137396 A1 | 11/2011 |

*Primary Examiner* — Ryan Howard

(57) ABSTRACT

A projector includes a light source, a digital micro-mirror device (DMD), a first prism, and a second prism. The light source emits incident light. The DMD reflects the incident light as an image light. The first prism is disposed between the light source and the DMD. The second prism is disposed between the first prism and the DMD. The first prism includes a first plane, a second plane, and an intermediate portion including a reflecting portion. The incident light is reflected by the reflecting portion and then passes through the second plane. The second prism includes a fourth plane, a fifth plane, and a sixth plane. When the DMD is operated in an OFF-state, the image light is reflected to the sixth plane, and the sixth plane reflects a leakage light of the image light along a predetermined light path away from the prisms.

11 Claims, 9 Drawing Sheets

(56) References Cited

U.S. PATENT DOCUMENTS

2016/0216599 A1\* 7/2016 Chien ................ G03B 21/2066

\* cited by examiner

PROJECTOR

BACKGROUND OF THE INVENTION

1. Field of the Invention

The present invention illustrates a projector and more particularly, the projector with a two-axis tilting digital micro-mirror device and low light leakage effect.

2. Description of the Prior Art

The conventional projector can project micro-images to a huge screen by a digital micro-mirror device (DMD). Further, since the conventional projector provides sufficient brightness, the image data can be displayed and then shared to everyone.

FIG. 1 illustrates a structure of a conventional projector 50. As shown in FIG. 1, the conventional projector 50 includes a digital micro-mirror device 10, a total internal reflection (TIR) prism set 11, a reflecting mirror (reflector) 12, a lens module 13, and a light pipe 14. For illustrating viewing direction explicitly, 3 perpendicular axes of Cartesian coordinates are represented on the right hand side in FIG. 1. Specifically, the viewing direction on X-axis is a direction from an origin point to the right side. The viewing direction on Y-axis is a direction from the origin point to the underside. The viewing direction on Z-axis is an incident direction on X-Y plane. In the conventional projector 50, an incident light passes the lens module 13 through the light pipe 14 and is reflected to the TIR prism set 11 by the reflecting mirror 12. Finally, the incident light is reflected as an image light by the digital micro-mirror device 10 and then projected to the screen. However, the digital micro-mirror device 10 can only receive the incident light with oblique incident direction because of the physical limitation of the digital micro-mirror device 10. Thus, the disposition between the TIR prism set 11 and the digital micro-mirror device 10 introduces an inclination angle (i.e., such as 45 degrees of angle). As a result, the volume of the conventional projector 50 is bounded by the inclination angle. Since the volume reduction is the major issue of the projector design, the conventional projector 50 with big volume becomes inconvenient and thereby losses of competitiveness.

Besides, when the digital micro-mirror device 10 of the projector 50 is operated in OFF-state, a leakage light of the image light may be reflected to the projector 50 back inside the TIR prism set 11. As a result, the effect of scattering reflection and diffuse reflection is introduced, especially in a cusp, gluing, or edge of the prisms. The effect of scattering reflection and diffuse reflection reduces contrast and quality of image display.

Thus, to develop a projector with small volume and low light leakage effect is important.

SUMMARY OF THE INVENTION

In an embodiment of the present invention, a projector is disclosed. The projector includes a light source, a digital micro-mirror device, a first prism, and a second prism. The light source is used for emitting an incident light. The digital micro-mirror device has a first side in a first direction and a second side in a second direction perpendicular to the first direction, wherein the first side is longer than the second side. The digital micro-mirror device receives and reflects the incident light as an image light. The first prism is disposed between the light source and the digital micro-mirror device for receiving and transmitting the incident light. The first prism includes a first plane faced to the light source for receiving the incident light, a second plane adjoined to the first plane, and an intermediate portion. The intermediate portion is adjoined to the first plane and includes a reflecting portion, wherein the incident light is reflected by the reflecting portion and then passes through the second plane. The second prism is disposed between the first prism and the digital micro-mirror device. The second prism includes a fourth plane, a fifth plane, and a sixth plane. The fourth plane is parallel to the second plane for receiving the incident light and reflecting the image light. The fifth plane is adjoined to the fourth plane and is parallel to the digital micro-mirror device, wherein the fifth plane includes an adjoining side paralleled to the first side. The sixth plane is adjoined to the fourth plane and the fifth plane, wherein the sixth plane is faced to a lens. The incident light is transmitted to the digital micro-mirror device through the fourth plane and the fifth plane, the incident light is reflected by the digital micro-mirror device as the image light to the sixth plane, when the digital micro-mirror device is operated in an OFF-state, the sixth plane reflects a leakage light of the image light along a predetermined light path away from the prisms.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
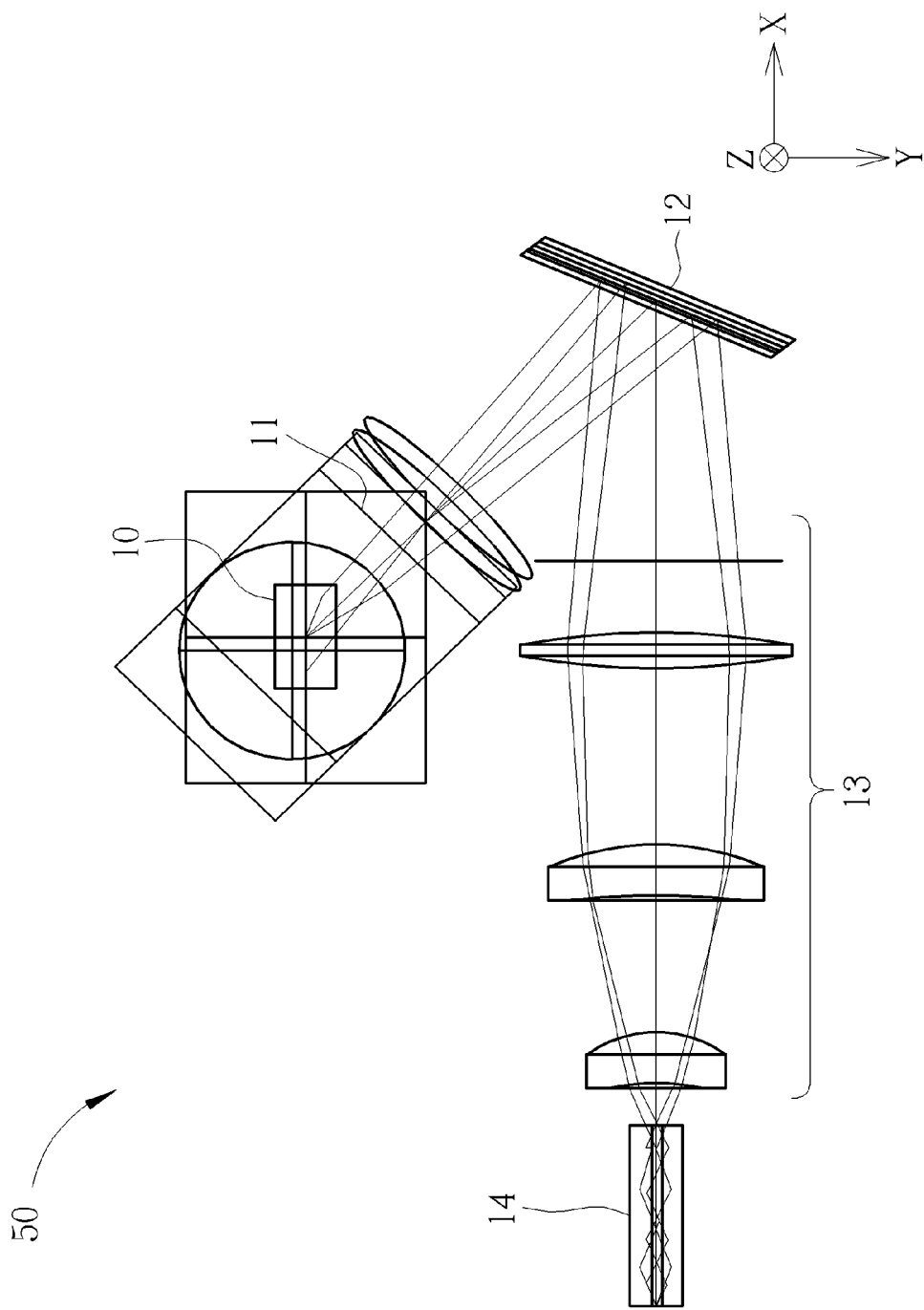
FIG. 1 illustrates a structure of a conventional projector.
Figure 2:
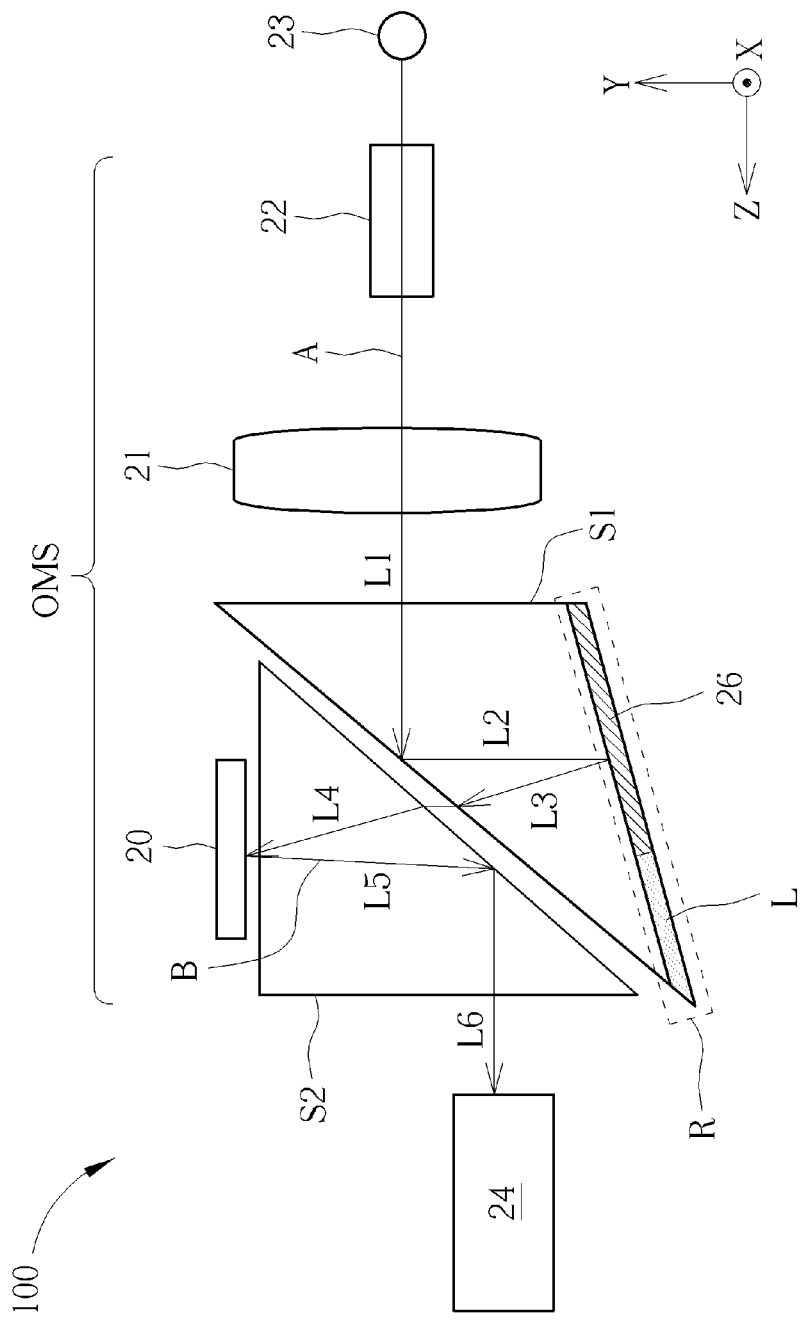
FIG. 2 illustrates a structure of a projector and light paths of the projector when a digital micro-mirror device is operated in an ON-state according to a first embodiment of the present invention.
Figure 3:
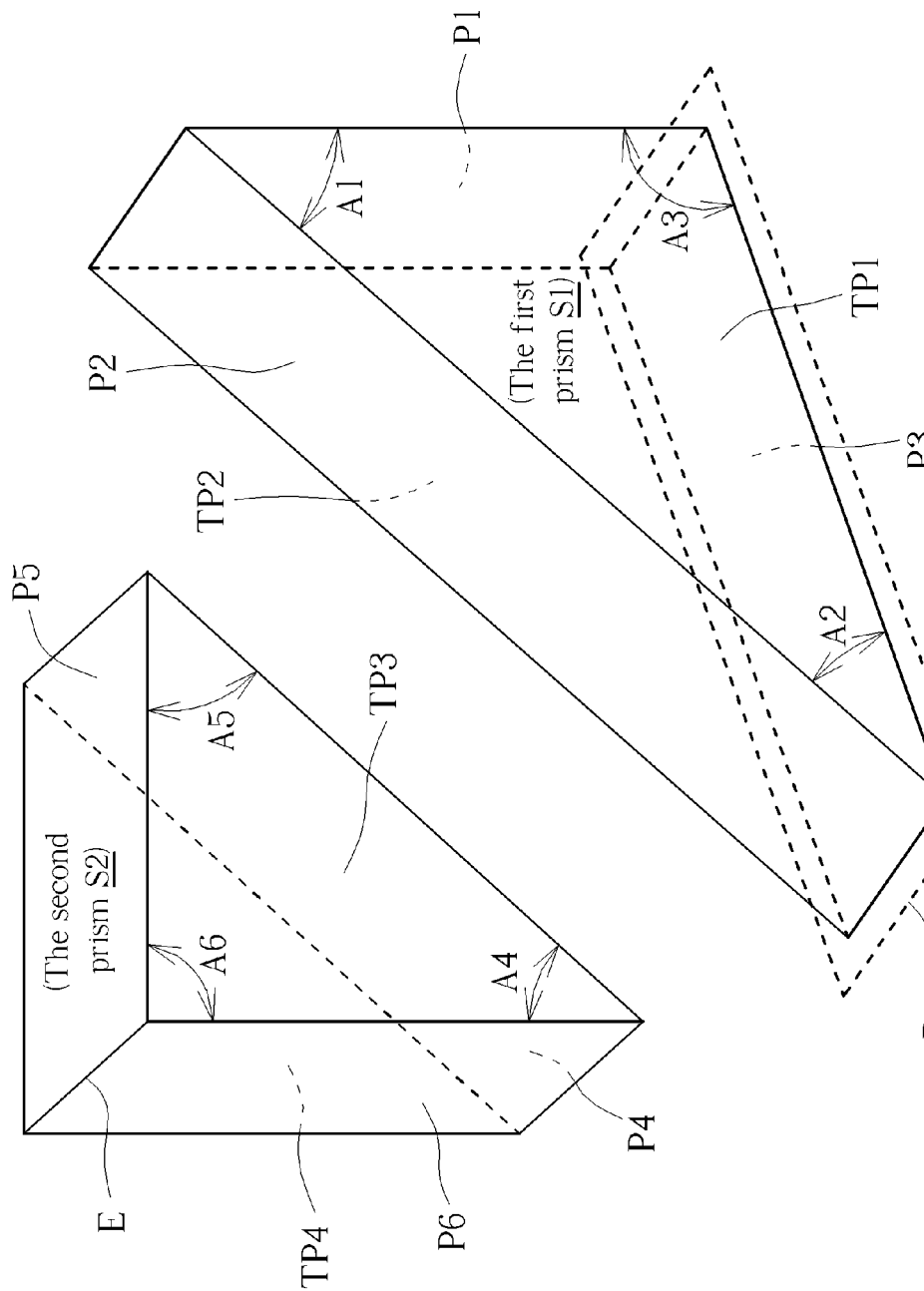
FIG. 3 illustrates a structure of two prisms of the projector in FIG. 2 according to the first embodiment of the present invention.
Figure 4:
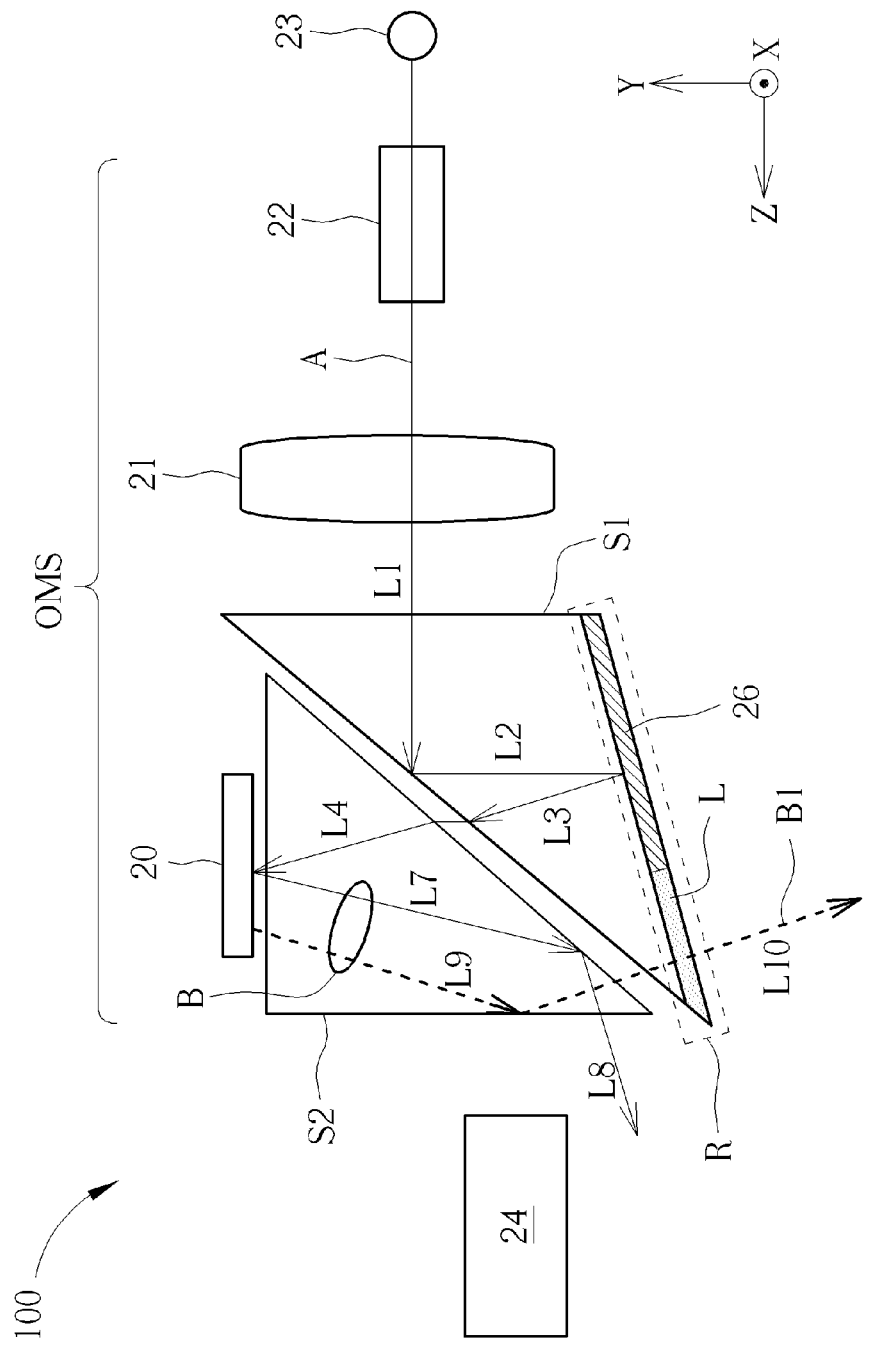
FIG. 4 illustrates light paths of the projector in FIG. 2 when a digital micro-mirror device is operated in an OFF-state according to the first embodiment of the present invention.

FIG. 2 illustrates a structure of a projector 100 and light paths of the projector 100 when a digital micro-mirror device 20 is operated in an ON-state according to a first embodiment of the present invention. FIG. 3 illustrates a structure of two prisms of the projector 100 in FIG. 2. FIG. 4 illustrates light paths of the projector 100 in FIG. 2 when a digital micro-mirror device 20 is operated in an OFF-state. The structure of the projector 100 according to the first embodiment, the structure of two prisms, and the light paths of the projector 100 under the digital micro-mirror device 20 being operated in an ON-state and OFF-state are expressed as follows. As shown in FIG. 2, the projector 100 includes a digital micro-mirror device 20, a lens module 21, a light pipe 22, a light source 23, a lens 24, a first prism S1, and a second prism S2. Specifically, the light pipe 22, the lens module 21, the first prism S1, the second prism S2, and the digital micro-mirror device 20 form an optical mechanical system OMS. The light source 23 is used for emitting an incident light A. The digital micro-mirror device 20 is a rectangular-shaped flat device. Specifically, the digital micro-mirror device 20 has a plurality of micro-mirrors for reflecting the incident light A as an image light B. The digital micro-mirror device 20 has a long side C in a first direction and a short side D in a second direction perpendicular to the first direction (i.e., see FIG. 6). In this embodiment, the digital micro-mirror device 20 is a two-axis tilting digital micro-mirror device (i.e., TRP (Tilt & Roll Pixel) DLP® Pico™ chipset). Particularly, each micro-mirror is sequentially tilted 12 degrees on two diagonal axes (i.e., equivalently, 17 degrees of tilting angle of the long side C on X-axis). Thus, the incident light A is reflected as the image light B with approximate 34 degrees of angle equivalently. In this embodiment, the operation of the digital micro-mirror device 20 is considered in an ON-state and in an OFF-state. The lens 24 is used for receiving the image light B. The first prism S1 and the second prism S2 are disposed among the lens module 21, the digital micro-mirror device 20, and the lens 24 for receiving the incident light A from the lens module 21 and reflecting the incident light A to the digital micro-mirror device 20. When the digital micro-mirror device 20 is operated in the ON-state, the image light B is transmitted to the lens 24. The first prism S1 includes an intermediate portion R. The intermediate portion R is adjoined to a first plane P1 (see FIG. 3) and includes a reflecting portion 26. In this embodiment, the reflecting portion 26 can be a mirror coating on a third plane P3 of the first prism S1 (see FIG. 3). In the projector 100, after the light source 23 emits the incident light A, the incident light A is transmitted to the lens module 21 through the light pipe 22. The incident light A is further transmitted to the first prism S1 along a light path L1. Then, the incident light A is transmitted to the reflecting portion 26 of the first prism S1 along a light path L2. After the incident light A is reflected by the reflecting portion 26, the incident light A is transmitted to the digital micro-mirror device 20 along a light path L3 and a light path L4 progressively. The digital micro-mirror device 20 reflects the incident light A as the image light B. In FIG. 2, when the digital micro-mirror device 20 is operated in the ON-state, the image light B is transmitted along a light path L5. Then, the image light B passes through the second prism S2 along a light path L6 and is received by the lens 24. In FIG. 4, when the digital micro-mirror device 20 is operated in the OFF-state, a leakage light B1 of the image light B (i.e., for example, a marginal ray of the image light B) is reflected (total internal reflection) by a sixth plane P6 of the second prism S2 (see FIG. 3) along a predetermined light path L10 away from the first prism S1 and the second prism S2. The detailed expression of light transmission process is illustrated later. For illustrating viewing direction explicitly, 3 perpendicular axes of Cartesian coordinates are represented on the lower right hand side in FIG. 2. and FIG. 4. Specifically, the viewing direction on X-axis is an emitting direction on Y-Z plane. The viewing direction on Y-axis is a direction from an origin point to the upside. The viewing direction on Z-axis is a direction from the origin point to the left side. In this embodiment, a space exists between the first prism S1 and the second prism S2. Another space also exists between the second prism S2 and the digital micro-mirror device 20. Although two spaces are introduced in this embodiment, the present invention is not limited by the two spaces. For example, in other embodiments, no space is introduced between the first prism S1 and/or the second prism S2, and between the second prism S2 and the digital micro-mirror device 20. The structure of the first prism S1 and the second prism S2 in the projector 100 and the light transmission process (i.e., including the incident light A, the image light B, and the leakage light B1) under the digital micro-mirror device 20 being operated in the ON-state and OFF-state are illustrated below.

FIG. 3 illustrates a structure of the first prism S1 and the second prism S2 of the projector 100. In this embodiment, the first prism S1 is a triangular prism with 5 planes. The first prism S1 includes a first triangular plane TP1, a second triangular plane TP2, a first plane P1, a second plane P2, and an intermediate portion R. The intermediate portion R is adjoined to the first plane P1 and includes the third plane P3. A first angle A1 is located between the first plane P1 and the second plane P2. A second angle A2 is located between the second plane P2 and the third plane P3. A third angle A3 is located between the third plane P3 and the first plane P1. In some embodiments, the third angle A3 is greater than the first angle A1 and the second angle A2. For example, the first angle A1 can be 35.5 degrees. The second angle A2 can be 45.0 degrees. The third angle A3 can be 99.5 degrees. The second prism S2 is also a triangular prism with 5 planes. The second prism S2 includes a third triangular plane TP3, a fourth triangular plane TP4, a fourth plane P4, a fifth plane P5, and a sixth plane P6. A fourth angle A4 is located between the fourth plane P4 and the sixth plane P6. A fifth angle A5 is located between the fourth plane P4 and the fifth plane P5. A sixth angle A6 is located between the fifth plane P5 and the sixth plane P6. In some embodiments, the fifth angle A5 can be equal to the second angle A2. For example, the fifth angle A5 can be 45.0 degrees. The fourth angle A4 can be 45.0 degrees. The sixth angle A6 can be 90.0 degrees. Specifically, the first prism S1 and the second prism S2 have to satisfy the following conditions in some preferred embodiments. The second plane P2 of the first prism S1 is parallel to the fourth plane P4 of the second prism S2. The fifth plane P5 of the second prism S2 is parallel to the digital micro-mirror device 20 in FIG. 2 on Z-axis. The fifth plane P5 of the second prism S2 is perpendicular to the sixth plane P6. The adjoining side E is introduced between the fifth plane P5 and the sixth plane P6 of the second prism S2. Specifically, the adjoining side E is parallel to the digital micro-mirror device 20 on X-axis. An optional condition is also introduced that the first plane P1 of the first prism S1 is paralleled to the sixth plane P6 of the second prism S2. The transmission processes of the incident light A, the image light B, and the leakage light B1 of the projector 100 are illustrated below.

In projector 100, the light pipe 22 receives the incident light A emitted from the light source 23. In some embodiments, the light pipe 22 can be a wedge-shaped light pipe. The wedge-shaped light pipe is defined that the measure of caliber for receiving the incident light A is greater than the measure of caliber for outputting the incident light A. Thus, the coupling efficiency of the light pipe 22 can be improved.

The incident light A passes through the light pipe 22 and the lens module 21 progressively. The function of the lens module 21 is used for concentrating the beam from the incident light A by light focusing characteristics. By doing so, the incident light A can be projected on the digital micro-mirror device 20 precisely. In some embodiments, the lens module 21 includes at least one lens. An equivalent focal length of the lens module may be 80 mm-82 mm. However, arbitrary equivalent focal length of the lens module can also be applied to other embodiments. In this embodiment, the incident light A is transmitted to the first plane P1 perpendicularly through the lens module 21. In other words, the transmitted direction of the incident light A is parallel to the direction of a normal vector of the first plane P1. The incident light A is transmitted along a light path L1 inside the first prism S1. Then, the incident light A is reflected by the second plane P2 of the first prism S1. Here, the reflection is a total internal reflection. After the incident light A is reflected, the incident light A is transmitted to the reflecting portion 26 of the intermediate portion R along a light path L2. The intermediate portion R includes the third plane P3. In this embodiment, the reflecting portion 26 is a mirror coating on the third plane P3. After the incident light A is reflected by the reflecting portion 26, the incident light A is transmitted to the second plane P2 along a light path L3. The incident light A further passes through the second plane P2 along the light path L3. The incident light A is refracted by a space (air) between the first prism S1 and the second prism S2. Then, the incident light A passes through the fourth plane P4 and the fifth plane P5 of the second prism S2 progressively along a light path L4. Finally, the incident light A is transmitted to the digital micro-mirror device 20. Here, the digital micro-mirror device 20 is a rectangular-shaped device and has the long side C on X-axis and the short side D on Z-axis (see FIG. 6). The adjoining side E between the fifth plane P5 and the sixth plane P6 of the second prism S2 is parallel to the long side C of the digital micro-mirror device 20 on X-axis. Thus, the beam of the incident light A being transmitted to the digital micro-mirror device 20 along the light path L4 on X-Y plane can be regarded as the beam of the incident light A being transmitted to the long side C of the digital micro-mirror device 20 (see FIG. 6) without any additional inclination angle (i.e., a straight line transmission in FIG. 6). In some embodiments, since the digital micro-mirror device 20 is a two-axis tilting digital micro-mirror device (i.e., TRP (Tilt & Roll Pixel) DLP® Pico™ chipset), each micro-mirror can be sequentially tilted 12 degrees on two diagonal axes (i.e., equivalently, 17 degrees of tilting angle of the long side C on X-axis). As a result, in FIG. 2, after the incident light A is transmitted to the digital micro-mirror device 20 along the light path L4, the incident light A is reflected as the image light B with approximately 34 degrees of angle. Further, the image light B is transmitted along the light path L5. After the image light B passes through the fifth plane P5 of the second prism S2, the image light B is transmitted to the fourth plane P4. Then, the image light B is reflected by the fourth plane P4 and is transmitted to the lens 24 along a light path L6 by passing through the sixth plane P6. Here, the reflection of the image light B on the fourth plane P4 is a total internal reflection. Specifically, the image light B is perpendicularly transmitted to the sixth plane P6 of the second prism S2. Thus, the image light B passes through the sixth plane P6 without any reflection. Finally, the image light B is received by the lens 24. In other words, when the digital micro-mirror device 20 is operated in the ON-state, no reflection or refraction of the image light B on the sixth plane P6 is introduced. In FIG. 4, when the digital micro-mirror device 20 is operated in the OFF-state, the image light B reflected by the digital micro-mirror device 20 is almost transmitted along a light path L7, reflected by the fourth plane, and then passes through the sixth plane along a light path L8. Thus, most of image light B (i.e., Chief Ray) is not received by the lens 24. However, in FIG. 4, a fraction of the image light B becomes the leakage light B1 (i.e., for example, the marginal ray of the image light B). The power ratio of the leakage light B1 over the image light B is around 4%. The leakage light B1 is transmitted along a light path L9 and is reflected by the sixth plane P6. Then, the leakage light B1 is received by a low reflecting area L along a predetermined light path L10. Thus, the projector 100 in FIG. 2 and in FIG. 4, when the digital micro-mirror device 20 is operated in the ON-state, the image light B is received by the lens 24. When the digital micro-mirror device 20 is operated in the OFF-state, the image light B is not received by the lens 24 but a fraction of the image light B becomes the leakage light B1. However, the leakage light B1 is received by the low reflecting area L along the light path L10. Equivalently, the low reflecting area L absorbs the leakage light B1. In other embodiments, the leakage light B1 passes through the low reflecting area L as to transmit away from the first prism S1 and the second prism S2 along the light path L10. Thus, no scattering reflection or diffuse reflection of the leakage light B1 is introduced inside the first prism S1 and the second prism S2. As a result, the contrast of image display in the projector 100 can be improved.

Figure 5:
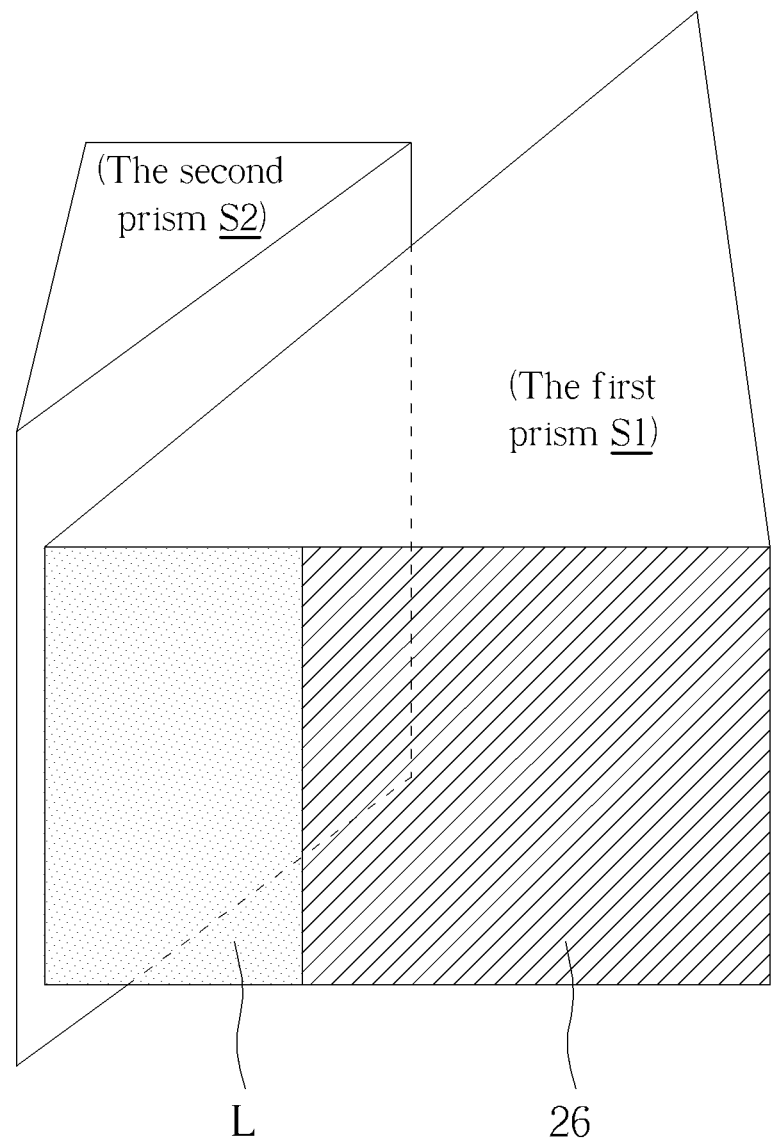
FIG. 5 illustrates a schematic diagram of relative positions between a reflecting portion and a low reflecting area in an intermediate portion of the projector in FIG. 2 according to the first embodiment of the present invention.

FIG. 5 illustrates a schematic diagram of relative positions between a reflecting portion 26 and a low reflecting area L in an intermediate portion R of the projector 100 in FIG. 2. In this embodiment, the reflecting portion 26 is disposed outside a predetermined light path L10. Thus, a leakage light B1 is not reflected by the reflecting portion 26. Specifically, the reflecting portion 26 only reflects an incident light A. Here, the low reflecting area L can be a transparent or transmissive coating. The leakage light B1 can pass through the low reflecting area L. Alternatively, the low reflecting area L can also be an anti-reflecting coating. For example, the low reflecting area L is a BARE-coating (96% light absorption rate and 4% light reflection rate), or an AR-coating (99.5% light absorption rate and 0.5% light reflection rate). However, the material of the low reflecting area L in the projector 100 is not limited by the BARE-coating or the AR-coating. In other embodiments, arbitrary material with high light absorption rate can be applied to the low reflecting area L. Further, the relative positions between the reflecting portion 26 and the low reflecting area L in the intermediate portion R of the projector 100 are not limited by the relative positions illustrated in FIG. 5. The reflecting portion 26 and the low reflecting area L in the intermediate portion R of the projector 100 can be appropriately adjusted that the incident light A can be reflected to the digital micro-mirror device 20 while rejecting the leakage light B1. For example, the area of the reflecting portion 26 can be reduced appropriately. By doing so, when the reflecting portion 26 is disposed on the central surface of the intermediate portion R, the reflecting portion 26 reflects the incident light A to the digital micro-mirror device 20 with minimal reflecting area. Besides, the low reflecting area L can also be chosen appropriately to improve the resistance of the scattering reflection or diffuse reflection of the leakage light B1.

Figure 6:
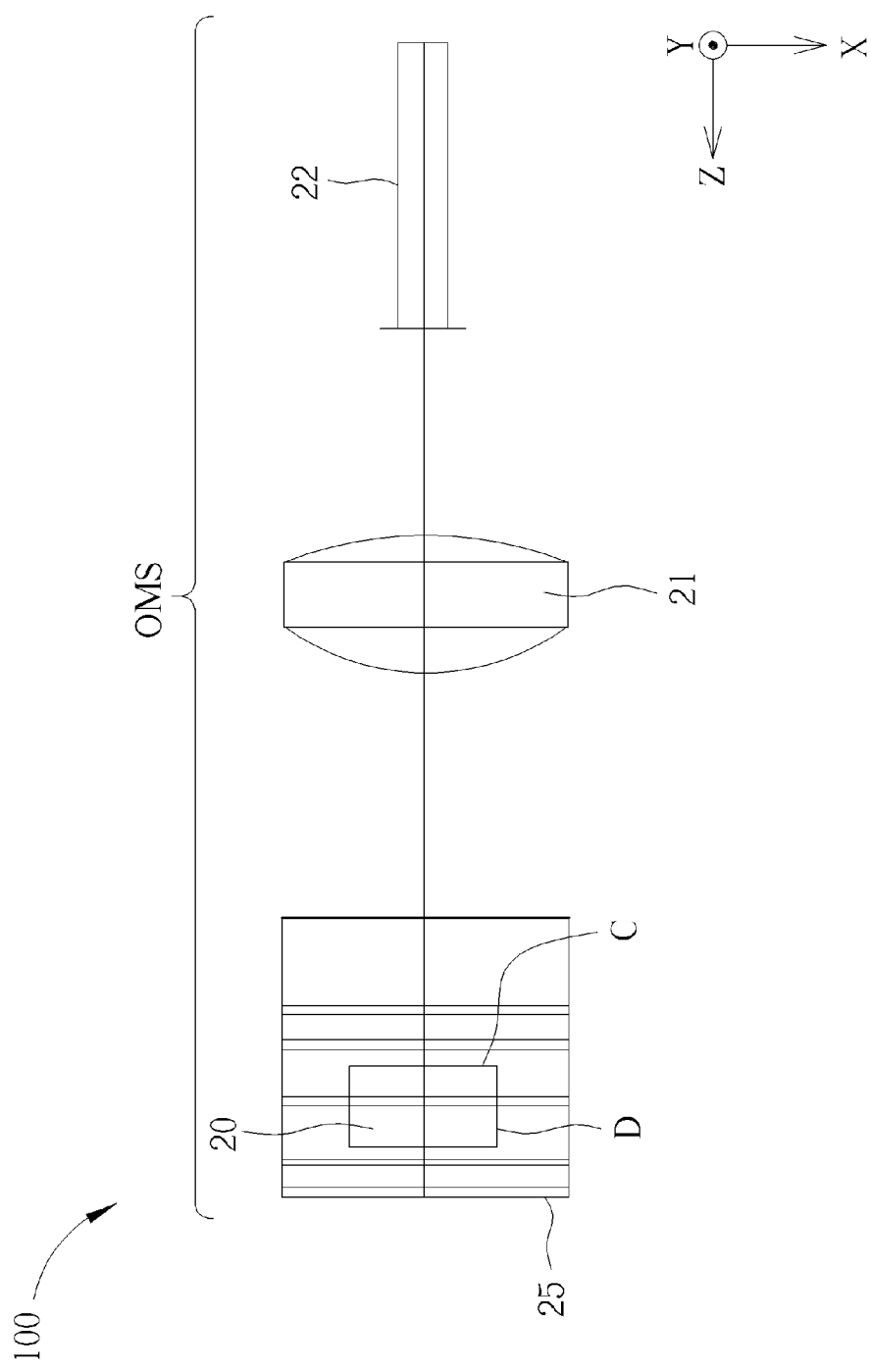
FIG. 6 illustrates a side view of an optical mechanical system in FIG. 2 according to the first embodiment of the present invention.

FIG. 6 illustrates a side view of an optical mechanical system OMS of the projector 100. As shown in FIG. 6, for illustrating viewing direction explicitly, 3 perpendicular axes of Cartesian coordinates are represented. Specifically, the viewing direction on X-axis is a direction from an origin point to the underside. The viewing direction on Y-axis is an emitting direction on X-Z plane. The viewing direction on Z-axis is a direction from the origin point to the left side. Thus, in the viewing direction in FIG. 6, the incident light A is transmitted in a straight line through the light pipe 22, the lens module 21, the TIR (Total Internal Reflection) prism set 25 (including the first prism S1 and the second prism S2), and the digital micro-mirror device 20 (i.e., the incident light A is reflected on Y-Z plane so that it can be observed as a straight line transmission in the viewing direction on X-Z plane, thereby leading no additional inclination angle). Equivalently, the incident light A is transmitted to the long side C of the digital micro-mirror device 20. As a result, since no inclination angle is introduced between the TIR prism set 25 and the digital micro-mirror device 20, the volume of the projector 100 can be reduced.

Figure 7:
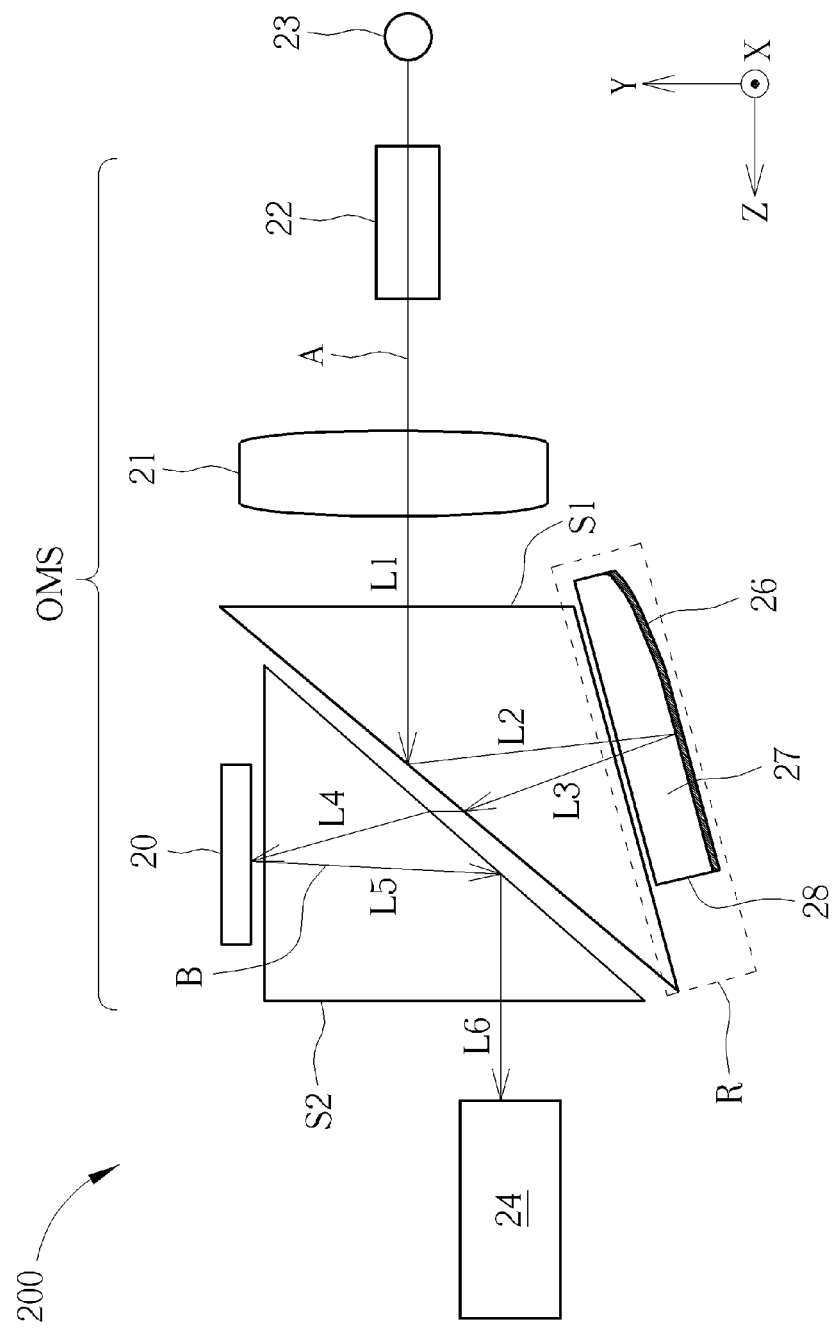
FIG. 7 illustrates a structure of a projector and light paths of the projector when the digital micro-mirror device is operated in an ON-state according to a second embodiment of the present invention.
Figure 8:
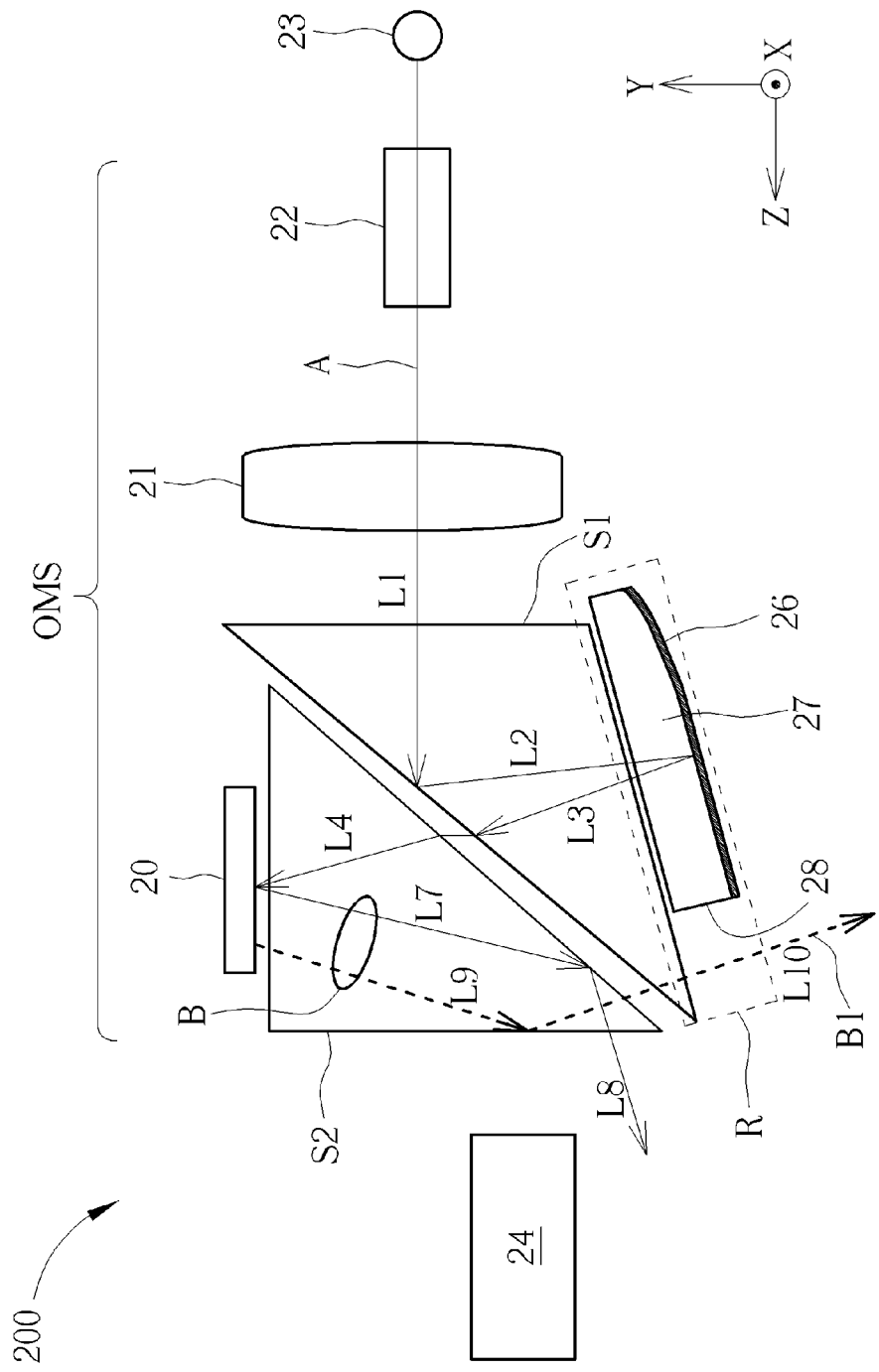
FIG. 8 illustrates light paths of the projector in FIG. 7 when the digital micro-mirror device is operated in an OFF-state according to the second embodiment of the present invention.

FIG. 7 illustrates a structure of a projector 200 and light paths of the projector 200 when the digital micro-mirror device 20 is operated in an ON-state according to a second embodiment of the present invention. FIG. 8 illustrates light paths of the projector 200 in FIG. 7 when a digital micro-mirror device 20 is operated in an OFF-state. As shown in FIG. 7 and FIG. 8, the optical mechanical system OMS of the projector 200 is similar to the optical mechanical system OMS of the projector 100, including a digital micro-mirror device 20, a lens module 21, a light pipe 22, a first prism S1, and a second prism S2. The viewing directions in FIG. 7 and FIG. 8 are same as the viewing directions in FIG. 2 and FIG. 4. Thus, the illustration of the viewing directions in FIG. 7 and FIG. 8 is omitted here. The difference between the projector 200 and the projector 100 is that an equivalent focal length of the optical mechanical system OMS in projector 200 is formed by a combination of the focal length of the lens module 21 and the reflecting lens 27 with a cutting plane 28 inside the intermediate portion R. An equivalent focal length of the optical mechanical system OMS in projector 100 is only affected by the focal length of the lens module 21. In other words, the projector 200 can perform a predesigned focal length with shorter light distance of the optical mechanical system OMS than the projector 100. Thus, the optical path of the incident light A passing through the optical mechanical system OMS of the projector 200 can be further reduced. In FIG. 7, when the digital micro-mirror device 20 is operated in the ON-state, the image light B is received by the lens 24 along the light path L6 (see FIG. 2). As shown in FIG. 8, when the digital micro-mirror device 20 is operated in the OFF-state, the transmission of the leakage light B1 is similar to the transmission in FIG. 4. The leakage light B1 is transmitted along the light path L9, reflected by the sixth plane P6, and passes through the fourth plane P4, the second plane P2, and the third plane P3 along the predetermined light path L10. Here, the reflecting lens 27 is not completely covered with the third plane P3 and includes a cutting plane 28. A space exists between the cutting plane 28 and the third plane P3. Specifically, the space is located on the light path L10 so that the leakage light B1 can pass through without any reflection. Thus, after the leakage light B1 passes through the third plane P3, the leakage light B1 passes through the space along the predetermined light path L10 away from the first prism S1 and the second prism S2. As a result, in the projector 200, when the digital micro-mirror device 20 is operated in the OFF-state, no scattering reflection or diffuse reflection of the leakage light B1 is introduced inside the first prism S1 and the second prism S2.

Figure 9:
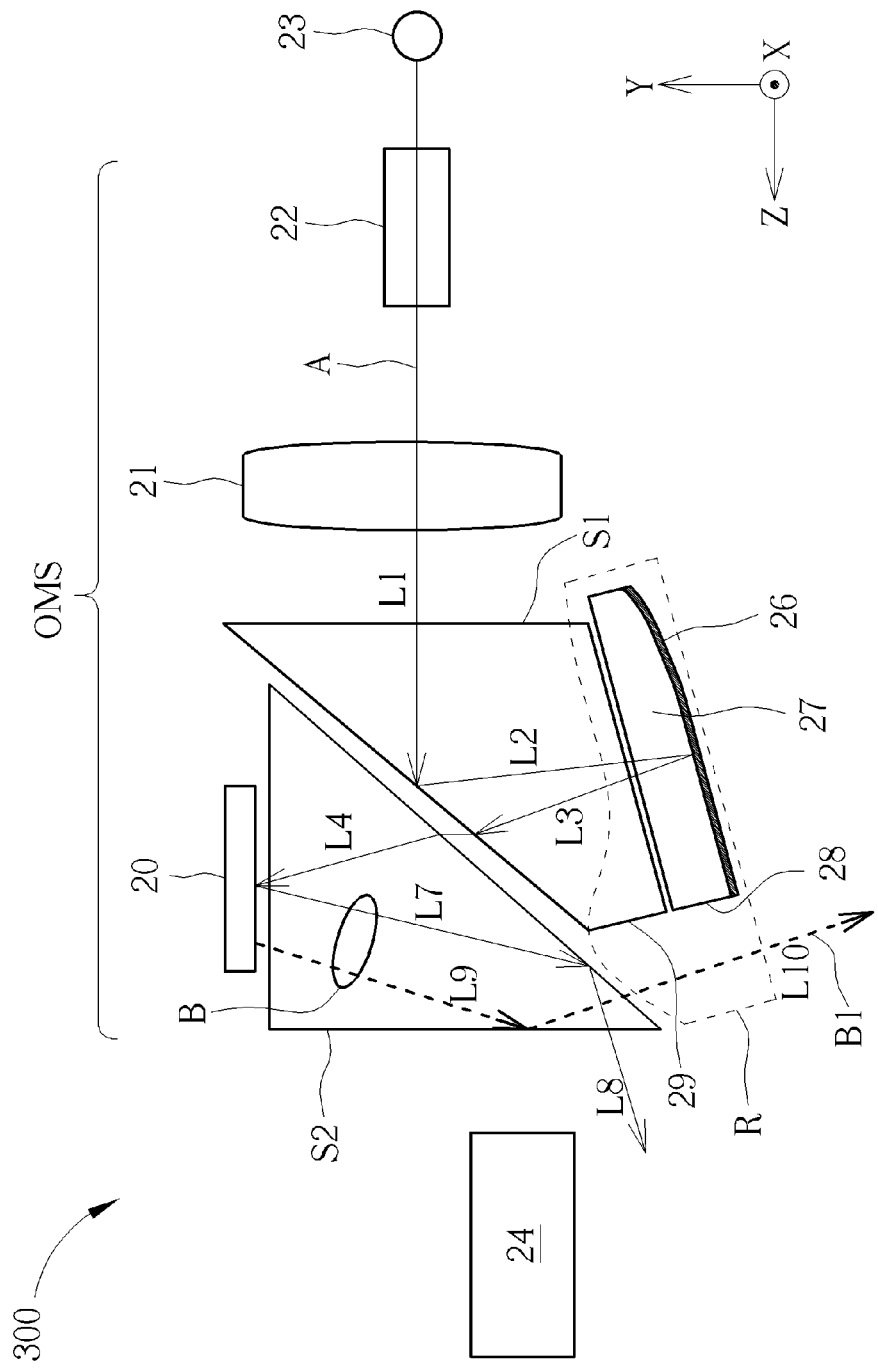
FIG. 9 illustrates light paths of a projector when the digital micro-mirror device is operated in the OFF-state according to a third embodiment of the present invention.

FIG. 9 illustrates light paths of a projector 300 when a digital micro-mirror device 20 is operated in an OFF-state according to a third embodiment of the present invention. Particularly, since the structure and the operation of the projector 300 are similar to the projector 200 when the digital micro-mirror device 20 is operated in an ON-state, they are omitted here. The difference between the projector 300 and the projector 200 is that the first prism S1 of the projector 300 includes a cutting plane 29. The cutting plane 29 is adjoined to the second plane S2 and the third plane S3. Thus, a space is introduced among the cutting plane 29 of the first prism S1, the fourth plane P4, and the cutting plane 28 of the reflecting lens 27. Specifically, the space is located on the light path L10 so that the leakage light B1 can pass through without any reflection. Thus, after the leakage light B1 is reflected by the sixth plane P6, the leakage light B1 passes through the fourth plane along the predetermined light path L10. Then, the leakage light B1 passes through the space along the light path L10 away from the first prism S1 and the second prism S2. As a result, in the projector 300, when the digital micro-mirror device 20 is operated in the OFF-state, no scattering reflection or diffuse reflection of the leakage light B1 is introduced inside the first prism S1 and the second prism S2.

In the projectors 100, 200, and 300, the range of the digital micro-mirror device 20 for receiving the incident light A to the range of the light pipe 22 ratio is about 1.7~1.9. Equivalently, the magnification of the optical mechanical system OMS is about 1.7~1.9. Further, the aperture of the lens 24 is F1.7. However, the present invention is not limited by the specific magnification and aperture. For example, the magnification and the aperture can be any values in other embodiments.

To sum up, a projector is disclosed in the present invention. The idea is to use a two-axis tilting digital micro-mirror device for volume reduction. By doing so, no additional inclination angle is required between a TIR prism set and the digital micro-mirror device of the projector. Further, a reflecting (plano-convex) lens is introduced to shorten the distance of optical paths of an optical mechanical system. Besides, a low reflecting area and a cutting plane are introduced that the leakage light can be absorbed by the low reflecting area or pass through a space corresponding to the cutting plane away from the projector when the digital micro-mirror device is operated in an OFF-state. Thus, the projector in the present invention achieves volume reduction in conjunction with low light leakage effect, thereby increasing the convenience and the performance of image display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A projector comprising:
a light source for emitting an incident light;
a digital micro-mirror device having a first side in a first direction and a second side in a second direction perpendicular to the first direction, wherein the first side is longer than the second side, the digital micro-mirror device receives and reflects the incident light as an image light;
a first prism disposed between the light source and the digital micro-mirror device for receiving and transmitting the incident light, the first prism comprising:

a first plane faced to the light source for receiving the incident light;

a second plane adjoined to the first plane; and an intermediate portion adjoined to the first plane and comprising a reflecting portion, wherein the incident light is transmitted to the reflecting portion and is reflected by the reflecting portion, then, the incident light passes through the second plane; and a second prism disposed between the first prism and the digital micro-mirror device, the second prism comprising:

a fourth plane paralleled to the second plane for receiving the incident light and reflecting the image light;

a fifth plane adjoined to the fourth plane and paralleled to the digital micro-mirror device, wherein the fifth plane comprises an adjoining side paralleled to the first side; and a sixth plane adjoined to the fourth plane and the fifth plane, wherein the sixth plane is faced to a lens;

wherein the incident light is transmitted to the digital micro-mirror device through the fourth plane and the fifth plane, the incident light is reflected by the digital micro-mirror device as the image light to the sixth plane, when the digital micro-mirror device is operated in an OFF-state, the sixth plane reflects a leakage light of the image light along a predetermined light path away from the prisms.

2. The projector of claim 1, wherein the digital micro-mirror device is a two-axis tilting digital micro-mirror device.

3. The projector of claim 1, wherein the fifth plane is perpendicular to the sixth plane.

4. The projector of claim 1, wherein the intermediate portion further comprises a third plane, and the reflecting portion is a mirror coating on the third plane.

5. The projector of claim 1, wherein the intermediate portion further comprises a third plane, and the reflecting portion is a reflecting plane faced to the third plane.

6. The projector of claim 1, further comprising:

a lens module disposed between the light source and the first plane.

7. The projector of claim 6, wherein an equivalent focal length of the lens module is 80 mm~82 mm.

8. The projector of claim 6, further comprising:

a light pipe disposed between the light source and the lens module for receiving and transmitting the incident light.

9. The projector of claim 8, wherein the light pipe is a wedge-shaped light pipe.

10. The projector of claim 8, wherein the light pipe, the lens module, the prisms, and the digital micro-mirror device form an optical mechanical system with the magnification of the optical mechanical system being 1.7~1.9.

11. The projector of claim 1, wherein the reflecting portion is disposed outside the predetermined light path.

* * * * *